United States Patent
Alderman

(10) Patent No.: US 6,557,313 B1
(45) Date of Patent: May 6, 2003

(54) BLANKET INSULATION WITH REFLECTIVE SHEET AND AIR SPACE

(76) Inventor: Robert J. Alderman, 686 Highland Ter., Canyon Lake, TX (US) 78133

( * ) Notice: Subject to any disclaimer, the term of this patent is extended or adjusted under 35 U.S.C. 154(b) by 0 days.

(21) Appl. No.: 10/039,101

(22) Filed: Jan. 4, 2002

(51) Int. Cl.[7] .................................................. E04B 1/74
(52) U.S. Cl. .................... 52/407.3; 52/407.2; 52/407.3; 52/407.5
(58) Field of Search ............................ 52/407.3, 407.1, 52/407.2, 407.5, 302.5, 302.3, 408

(56) References Cited

U.S. PATENT DOCUMENTS

| | | | | |
|---|---|---|---|---|
| 2,239,394 A | * | 4/1941 | MacKechnie | 52/407.3 |
| 2,330,941 A | * | 10/1943 | Acuff | 52/407.1 |
| 4,726,985 A | * | 2/1988 | Fay et al. | 428/138 |
| 5,157,893 A | * | 10/1992 | Benson et al. | 52/406.3 |
| 5,491,952 A | | 2/1996 | Alderman et al | |
| 5,495,698 A | | 3/1996 | Alderman et al. | |
| 5,515,543 A | * | 5/1996 | Gioello | 2/69 |
| 5,551,203 A | | 9/1996 | Alderman et al. | |
| 5,561,959 A | | 10/1996 | Alderman et al. | |
| 5,626,936 A | | 5/1997 | Alderman | |
| RE35,603 E | * | 9/1997 | Lassiter | 52/408 |
| 5,770,295 A | | 6/1998 | Alderman | |
| 5,826,390 A | * | 10/1998 | Sacks | 52/302.1 |
| 5,918,436 A | * | 7/1999 | Alderman | 52/404.1 |
| 5,953,883 A | * | 9/1999 | Ojala | 52/220.1 |
| 6,067,764 A | * | 5/2000 | Johansen | 52/302.1 |
| 6,128,884 A | * | 10/2000 | Berdan et al. | 52/406.2 |

* cited by examiner

Primary Examiner—Carl D. Friedman
Assistant Examiner—Kevin McDermott
(74) Attorney, Agent, or Firm—Thomas, Kayden, Horstemeyer & Risley LLP

(57) ABSTRACT

Heat insulated wall structure includes interior blanket insulation positioned between adjacent ones of studs, interior of the exterior wall board. Reflective sheet material is placed adjacent the blanket insulation, and the interior wall board is applied over the reflective sheet material to the studs. Spacers are applied to the heat reflective sheet material so as to maintain the facing surfaces of the reflective sheet material and the next adjacent surface in spaced relationship, forming a dead air space therebetween. The dead air space adjacent the heat reflective sheet material maintains the high reflectivity properties of the reflective sheet material, giving the enhanced ability to reflect heat away from the interior of the wall structure.

40 Claims, 8 Drawing Sheets

BLANKET INSULATION WITH REFLECTIVE SHEET AND AIR SPACE

BACKGROUND OF THE INVENTION

Typical heat insulation placed in the walls, floors and ceilings of a home or other building structure includes a fiberglass blanket, which is rectangular in cross section. The blanket is cut to the desired length at the job site for placement between studs and joists of the building structure. In addition, a sheet of facing material usually is applied to one broad surface of the fiberglass blanket, with the facing material having overhanging edges extending beyond the sides of the blanket which form "tabs" that can be applied by the installer to studs, joists, etc. of the building structure to hold the blanket in place.

Fiberglass is one of the most desirable materials for forming blanket insulation because it traps a substantial amount of air between the fibers to form dead air spaces. This provides insulation against convection and conductive heat transfer. However, the fiberglass alone does not provide adequate heat insulation against radiant heat transfer. Therefore, an additional sheet of reflective material can be formed, such as aluminum foil, and applied over the fiberglass blanket. The foil sheet functions as a radiant heat transfer barrier.

One of the problems with the above noted structure is that when reflective surfaces of the foil engage another surface, such as the fiberglass of the blanket, the foil loses its ability to reflect heat. A space, such as an air space, must be maintained adjacent the foil so that the foil can function as an effective heat reflector.

Another problem with the use of reflective foil in combination with other insulation materials is that if the foil should become dirty from an accumulation of dust, trash, fibers, etc., the foil sheet looses its ability to reflect radiant heat.

It is this problem that the invention addresses.

SUMMARY OF THE INVENTION

Briefly described, the present invention comprises an improved heat insulation assembly for placement in and for becoming a part of a building structure, for insulating the structure from conduction, convection and radiant heat transfer through the walls and other structures of a building. In the disclosed embodiment a heat insulation object such as a blanket of heat insulation material is combined with the studs or other elongated parallel support members of a building structure. The blanket is elongated and rectangular in cross section, is formed of convection and conduction heat insulation material such as fiber glass, and is sized and shaped to fit in the space between adjacent studs or joists of a typical building structure. Typically, the blanket would be of a width and depth suitable for insertion between adjacent 2×4 inch studs on 16-inch centers.

A reflective sheet, such as aluminum foil, is positioned in overlying relationship with respect to a broad surface of the blanket, of a length and breadth sufficient to overlie the length and breadth of the broad surface of the blanket that faces the heat controlled space of the building. Spacers are positioned adjacent the reflective sheet material to form dead air spaces adjacent the reflective sheet material. The spacers avoid having the other materials of the wall structure from engaging the reflective sheet material and avoid the blocking of the ability of the sheet to reflect heat.

In a typical embodiment of the invention, the insulation blanket, formed of fiberglass, is positioned between the adjacent studs of a wall structure after the exterior rough surface of the wall has been formed with plywood or other conventional materials. The fiberglass blanket typically will have a vapor barrier formed by a vapor impervious sheet applied to one of its broad surfaces. The vapor barrier sheet extends beyond the side edges of the blanket to form connector tabs or strips, with the connector tabs being sized and shaped to extend over the adjacent studs, etc. so as to be connected by nails, staples, or other connectors to the adjacent studs of the wall structure. The reflective sheet material is applied between the insulation blanket and the interior wallboard of the wall structure.

In one embodiment of the invention the reflective sheet is applied between the blanket and interior wallboard of a wall structure by attaching side edge portions of the reflective sheet to the studs, with the body portion of the reflective sheet material overlying the body portion of the blanket. In another embodiment the reflective sheet is applied to the blanket, by attaching the edge portions of the reflective sheet to the connector tabs of the blanket. In yet another embodiment, the reflective sheet is applied to the interior wallboard, to the surface of the interior wallboard that faces the blanket.

In all of the embodiments spacers are positioned adjacent the surface of the reflective sheet insulation for forming a space adjacent the reflective surface of the sheet. Typically, the spacers will be placed between the reflective surface of the reflective sheet material and the wallboard. However, the reflective sheet can be installed with the spacers facing the blanket insulation.

The spacers can be formed of an inert material, preferably a light-weight, low heat transfer material, such as expanded polystyrene objects which is known in the industry as "plastic peanuts" that are commonly used as dunnage and packing material because of their light weight and ability to fill space. Other types of spacers can be utilized, such as expanded foam in the form of strips extending along a surface of the reflective sheet material, strands of rope, dollops of expanded polystyrene, sponge rubber, and other objects positioned adjacent the heat reflective material, and virtually any light weight, non-heat conductive, non-degradable materials that function to form space between the reflective surface of the sheet and the adjacent material of the wall structure.

In another embodiment of the invention, the heat reflective sheet can be formed with protrusions in the sheet that form the spacers between the flat body of the sheet and next adjacent structure of the wall. The protrusions can be placed in a facing relationship with respect to either the insulation blanket or in the opposite direction, facing the wallboard that forms the interior of the wall structure in the building structure.

An example would be the formation of the reflective sheet material in corrugations or pleats, of a series of protruding ribs, or of a series of protrusions.

All of the embodiments of the invention provide the combination of a body of heat insulation material that insulates against convection and conduction heat transfer, and a heat reflective sheet for insulation against radiant heat transfer. The reflective sheet is maintained in spaced relationship with respect to adjacent surfaces, at least on one side thereof, so as to form a clean dead air space that permits reflection of radiant heat by the reflective sheet material. Also, the reflective sheet material and the dead air space between the reflective sheet material and the blanket insulation form additional insulation against convection in the overall insulated structure.

Thus, it is an object of this invention to provide an improved heat insulated wall structure for a building, to be positioned between an interior heat controlled space of the building structure and the outside environment adjacent the building structure.

Another object of this invention is to provide a heat insulated wall structure that utilizes reflective sheet material and means for spacing the reflective sheet material from an adjacent surface so as to provide a dead air space adjacent the reflective surface, thereby preserving the ability of the reflective sheet material to reflect heat.

Another object of this invention is to provide heat insulation material for application to a wall structure of a building, utilizing reflective sheet material and a spacer adjacent at least one surface of the reflective sheet material so as to maintain a dead air space adjacent the reflective sheet material for the purpose of preserving the reflective properties of the sheet material.

Other objects, features and advantages of this invention will become apparent upon reading the following specification, when taken in conjunction with the accompanying drawings.

DETAILED DESCRIPTION

Figure 1:
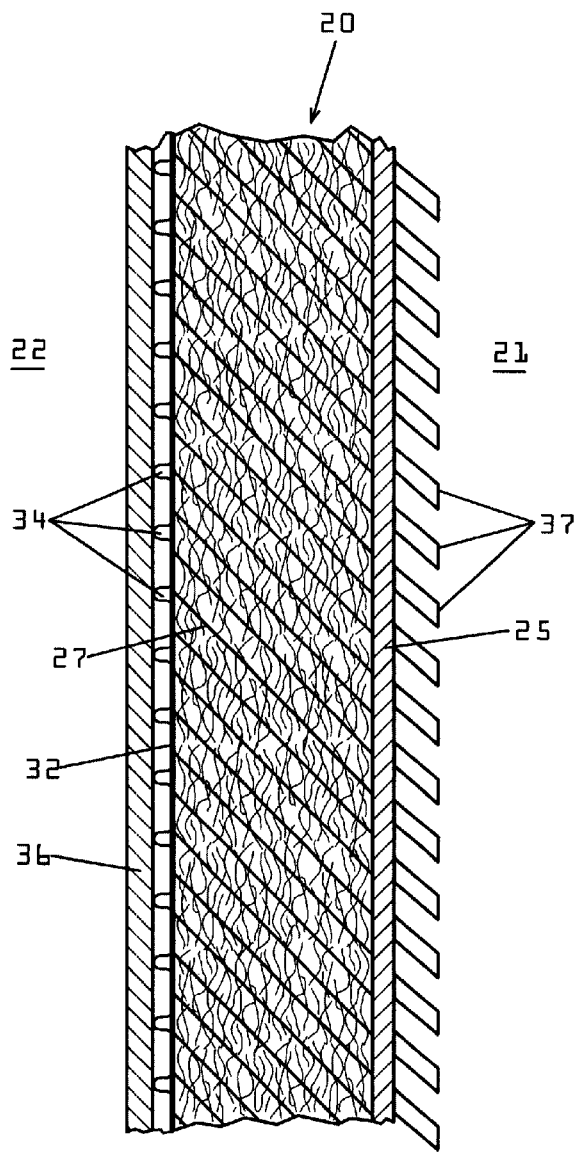
FIG. 1 is a side cross-sectional view of a heat insulated wall structure for a building, in accordance with this invention, showing the spacers positioned between the reflective sheet and the interior wallboard.
Figure 2:
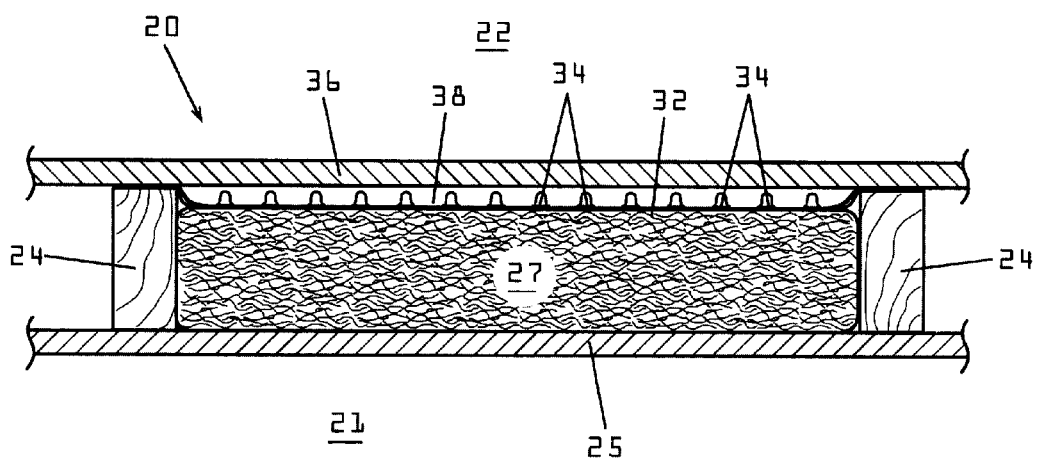
FIG. 2 is an end cross section of the wall structure of FIG. 1.
Figure 2A:
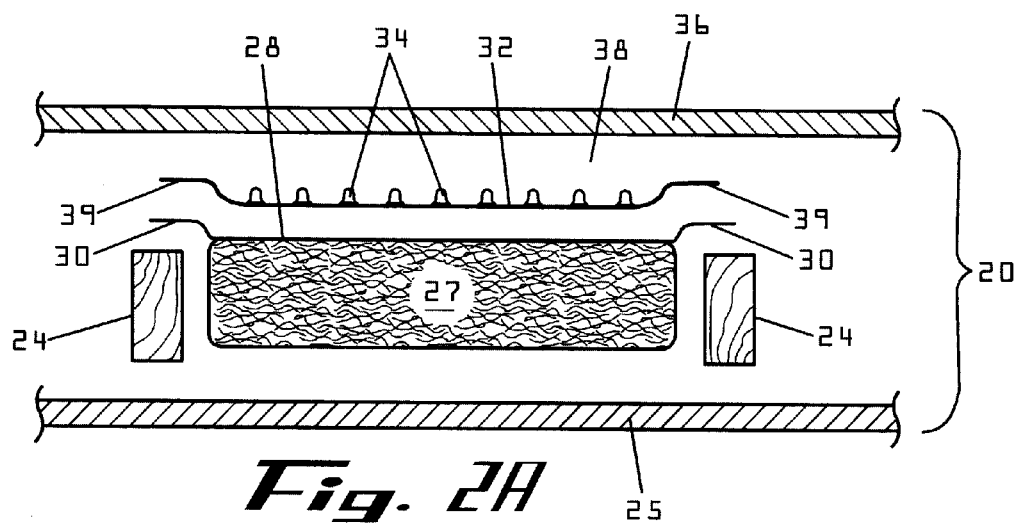
FIG. 2A is an expanded end cross section of the wall structure of FIGS. 1 and 2.

Referring now in more detail to the drawings in which like numerals indicate like parts throughout the several views, FIG. 1 illustrates a heat insulated wall structure of a building, particularly the exterior wall of a building, wherein the wall structure 20 is positioned between the outside environment 21 and the temperature controlled inside environment 22. As shown in FIG. 2, the wall structure 20 is formed by a plurality of equally spaced upright studs 24, an exterior wall 25 applied to the studs with nails or other fasteners, so that the exterior wall 25 is positioned between the studs 24 and the outside environment 21.

Lengths of blanket insulation 27 are positioned between adjacent studs 24 in the wall structure. Typically, the blanket insulation is formed of fiberglass, and the surface of the blanket facing the temperature controlled inside environment 22 includes a vapor barrier sheet that covers the broad surface of the blanket facing the inside environment 22. The vapor barrier sheet 28 includes side edge tabs or strips 30 that extend from the side edges of the blanket insulation 27 a distance sufficient to extend across the inside edges of the adjacent studs 24, so that the tabs can be connected by staples or other fasteners to the inside surfaces of the studs 24, thereby holding the blanket insulation 27 in a stationary position between the studs as illustrated in FIG. 2.

Figure 3:
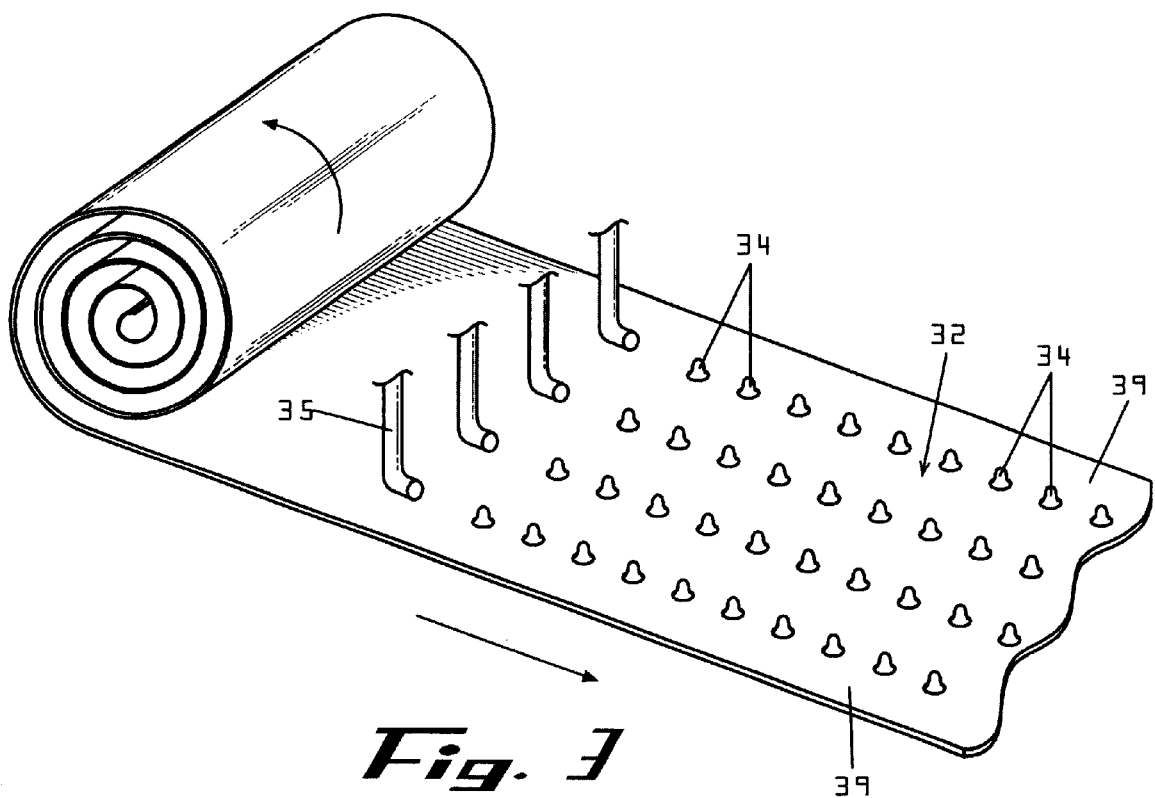
FIG. 3 is a schematic perspective illustration of a process for applying spacers to the reflective sheet material utilized in the wall structure illustrated in FIGS. 1 and 2.

Reflective sheet material 32 is positioned in overlying relationship with respect to the blanket insulation 27. The reflective sheet material can be aluminum foil or other highly reflective material, suitable for reflecting radiant heat. The reflective sheet material 32 includes spacers 34 positioned on at least one surface thereof, in an array so that the spacers are spaced from one another. The spacers can be formed from a variety of materials, such as discrete particles of expanded Styrofoam, known as peanuts. The spacers shown in FIG. 3 can be formed of foam material discharged from nozzles 35, with the nozzles being spaced apart a distance sufficient to create spaces between adjacent ones of the spacers 34. The nozzles discharge the spacers onto the moving heat reflective sheet 32 in small globs, so that spaces are formed between the spacers longitudinally as well as laterally.

As illustrated in FIG. 2, when the heat reflective sheet is mounted in the wall structure, the spacers 34 are oriented toward the temperature controlled inside environment 22 of the wall structure. If desired, the reflective sheet material 32 can be reversed in its position so that its spacers 34 face in the opposite direction, toward the blanket insulation 27, so as to form the dead air space between the reflective sheet material and the blanket 27. In both situations, the width of the heat reflective sheet is sufficient so that its side edges 39 can reach to the studs 24 and be fastened to the studs with staples or other connectors.

Next, the wallboard, such as gypsum or sheetrock 36, is applied to the wall structure with fasteners extending through the sheetrock and into the studs 24. Since the spacers 34 are positioned between the heat reflective sheet 32 and the sheetrock 36, a dead air space 38 is formed between the reflective sheet material 32 and the sheetrock 36.

Conventional exterior siding, such as clapboard, brick and other materials 37 (FIG. 1), can be applied to the wall structure, on the outside environment side, in the conventional manner, thereby completing the wall structure. Of course, other items, such as electrical wiring, plumbing, heat ducts, etc. can be run internally through the wall structure in the usual manner, by extending through holes in the studs 24, etc.

Figure 4:
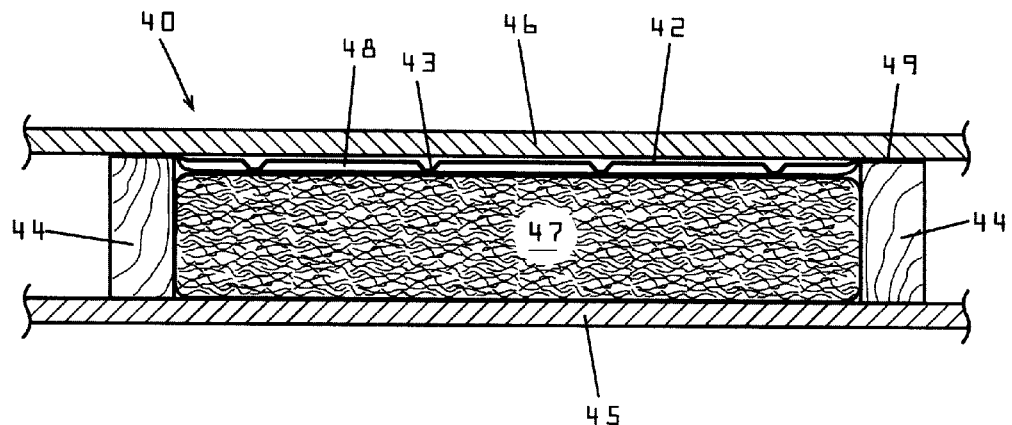
FIG. 4 is an end cross-sectional view of a second embodiment of the heat insulated wall structure for a building, wherein the reflective sheet material is formed in the configuration of pleats or corrugations that space the reflective sheet from the blanket insulation.
Figure 5:
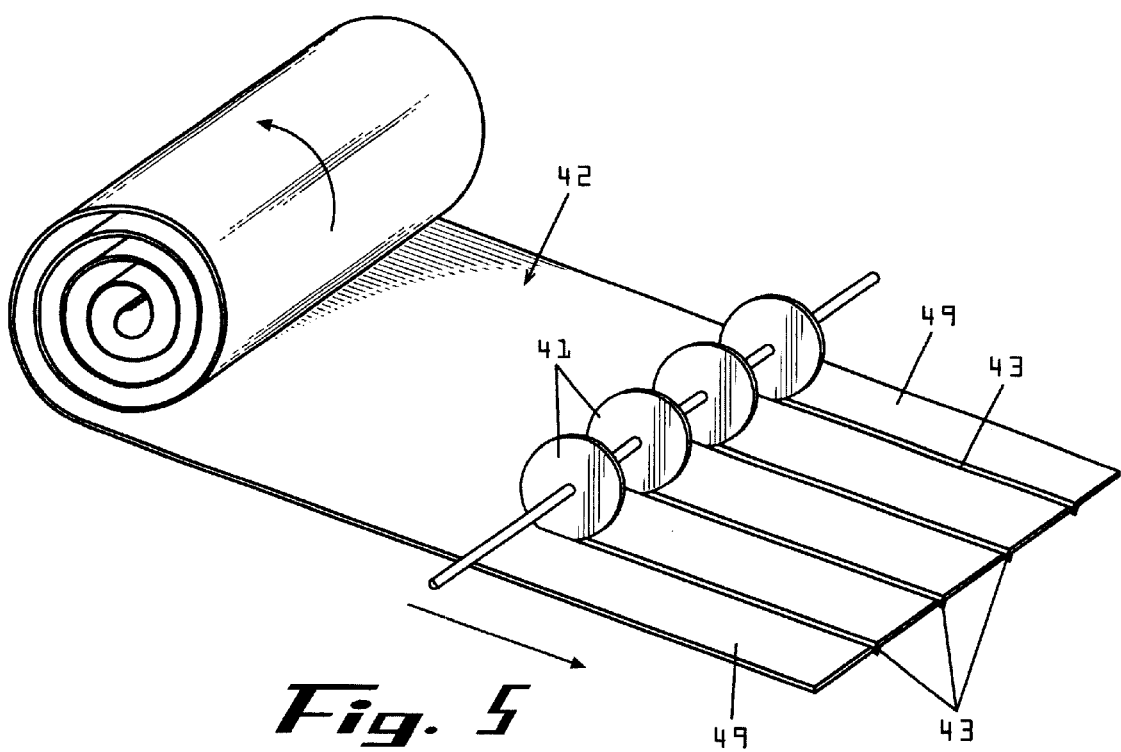
FIG. 5 is a schematic perspective illustration of the manner in which the reflective sheet material is formed with pleats.

FIGS. 4 and 5 illustrate another embodiment of the invention. As shown in FIG. 4, another type wall structure 40 includes studs 44, exterior wall board 45, heat insulation blanket 47, reflective sheet material 42, interior wall board or sheetrock 46, and dead air space 48 positioned between the reflective sheet material 42 and the blanket insulation 47.

As shown in FIG. 5, a plurality of pleats 43 are formed in the reflective sheet material, such as metal foil, by the use of rotary disks 41. The pleats function as spacers in the wall structure, as shown in FIG. 4. The reflective sheet material 42 can be positioned as illustrated, or can be reversed so that its pleats or spacers 43 face the interior wallboard 46.

As with FIG. 2, the side edges 49 of the heat reflective sheet 42 can be extended over the studs 44 and mounted thereto by staples or other connectors. This holds the reflective sheet material in position in the wall structure.

Figure 6:
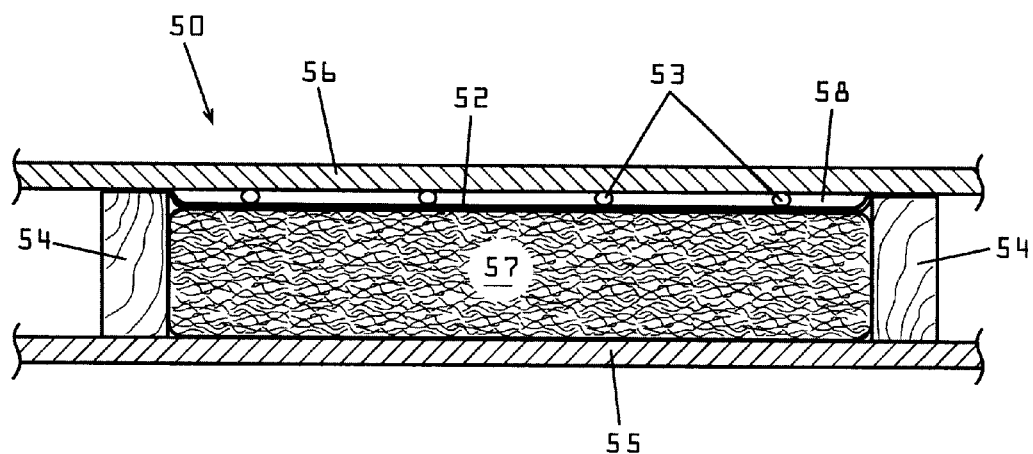
FIG. 6 is an end cross-sectional view of another embodiment of the heat insulated wall structure for a building, showing a plurality of strips of material that extend longitudinally on the heat reflective material, spacing the heat reflective material from the wall board.
Figure 7:
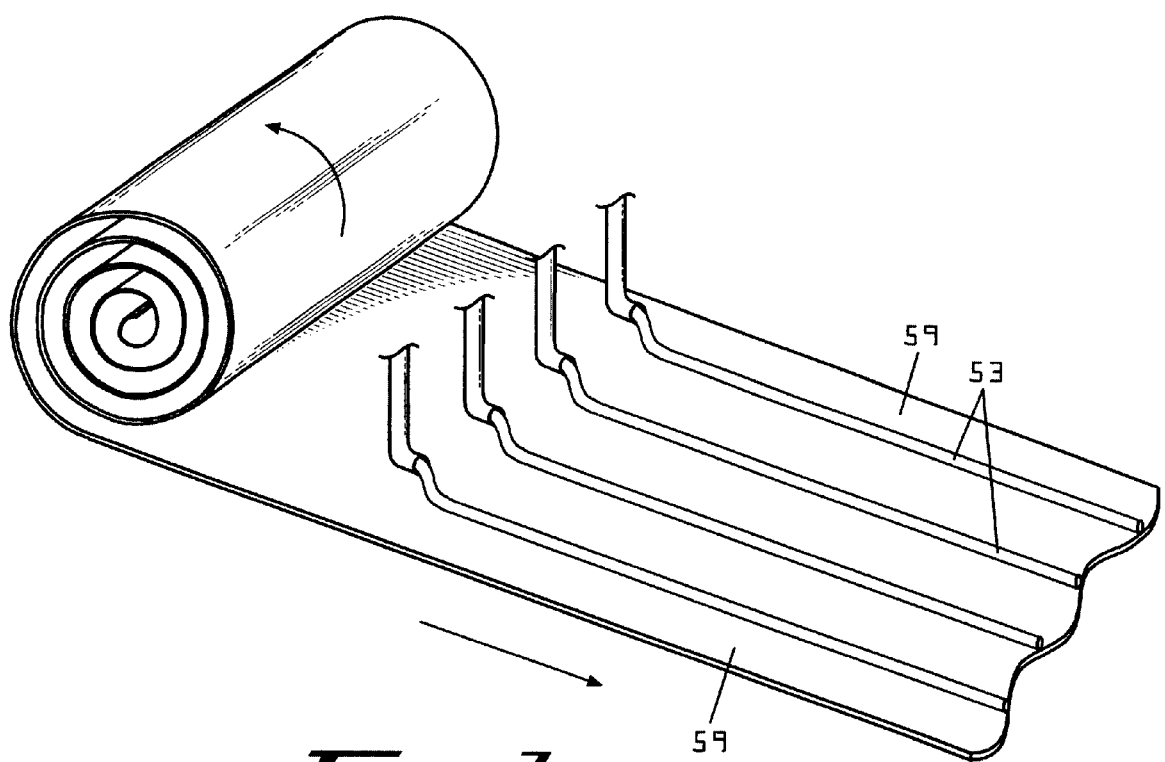
FIG. 7 is a schematic perspective illustration of the process of applying the spacer strips to the reflective sheet material.

FIGS. 6 and 7 show another embodiment of the invention. FIG. 6 again illustrates a heat insulated wall structure 50 that is formed by spaced studs 54, exterior wall board 55, blanket insulation 57, reflective sheet material 52, spacers 53, and dead air space 58. The side edges 59 of the reflective sheet material 52 are mounted to the studs 54 as described previously.

As illustrated in FIG. 7, the spacers 53 are formed by extruding quick-drying foam in strips along the length of the reflective sheet material 42, as the sheet material is advanced along a processing path. Once the plastic strips 53 have become cured, the reflective sheet material can be cut to length and installed in the manner as illustrated in FIG. 6, so as to create the dead air space 58 adjacent the wall board 56.

As with the embodiments of FIGS. 2 and 4, the reflective sheet material 52 can be installed as illustrated, or can be reversed so that the spacers 53 engage the blanket insulation 57 and create the dead air space adjacent the blanket insulation.

Figure 8:
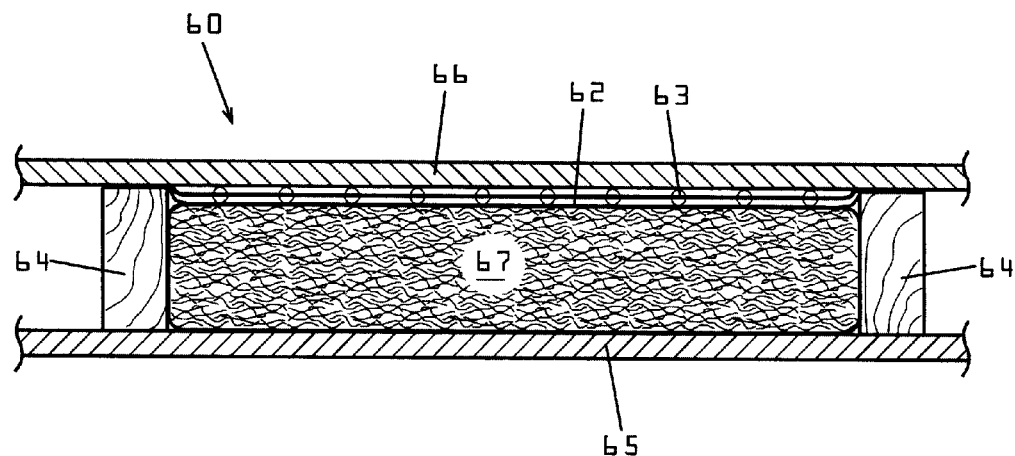
FIG. 8 is an end cross-sectional view of another embodiment of the heat insulated wall structure for a building, showing a sheet containing spaced bubbles placed adjacent a heat reflective sheet, forming air spaces adjacent the heat reflective sheet.
Figure 9:
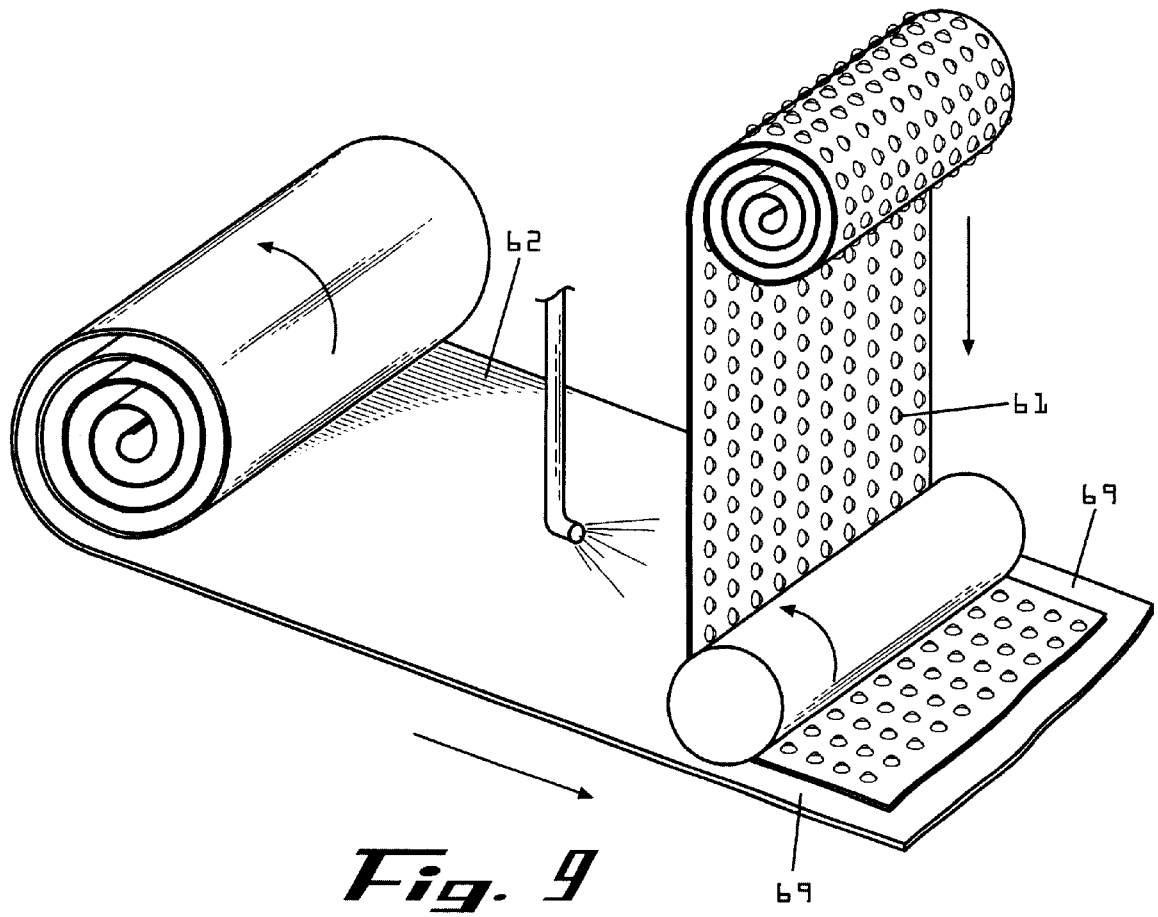
FIG. 9 is a schematic perspective illustration of the application of a bubble sheet to a heat reflective sheet.

FIGS. 8 and 9 illustrate another embodiment of the invention. As shown in FIG. 8, a wall structure 60 is formed with upright studs 64, exterior wall board 65, blanket insulation 67, interior wall board 66, reflective sheet material 62, and spacers 63. As shown in FIG. 9, the spacers are in the form of a bubble pack sheet 61 that is formed of overlying plastic sheets with an array of air bubbles trapped therebetween, of conventional design. The bubble pack sheet 61 is advanced into contact with the reflective sheet material 62, with a light spray of adhesive applied therebetween at 68, so that the bubble pack sheet adheres to the reflective sheet material 62. Thus, the bubble pack sheet 61 functions as a spacer adjacent the reflective sheet material, forming dead air spaces adjacent the reflective sheet material. The bubble pack sheet 61 is narrower than the reflective sheet material 62, leaving side edges 69 on the reflective sheet that can be mounted to the inside surfaces of the studs 64 to hold the reflective sheet material and the bubble pack sheet in place in the wall structure.

Figure 10:
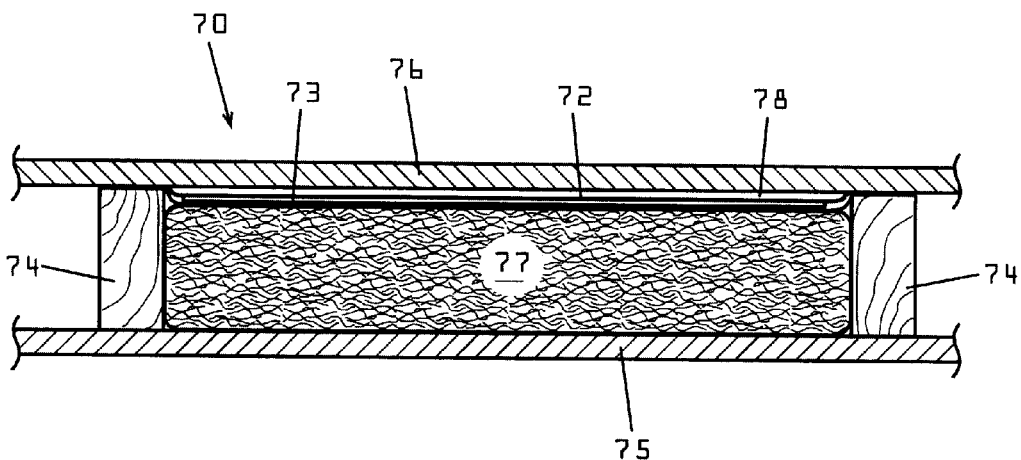
FIG. 10 is an end cross-sectional view of a heat insulated wall structure of a building, showing a heat reflective sheet positioned therein, with the sheet containing laterally extending ribs that function to space the heat reflective sheet from adjacent materials.
Figure 11:
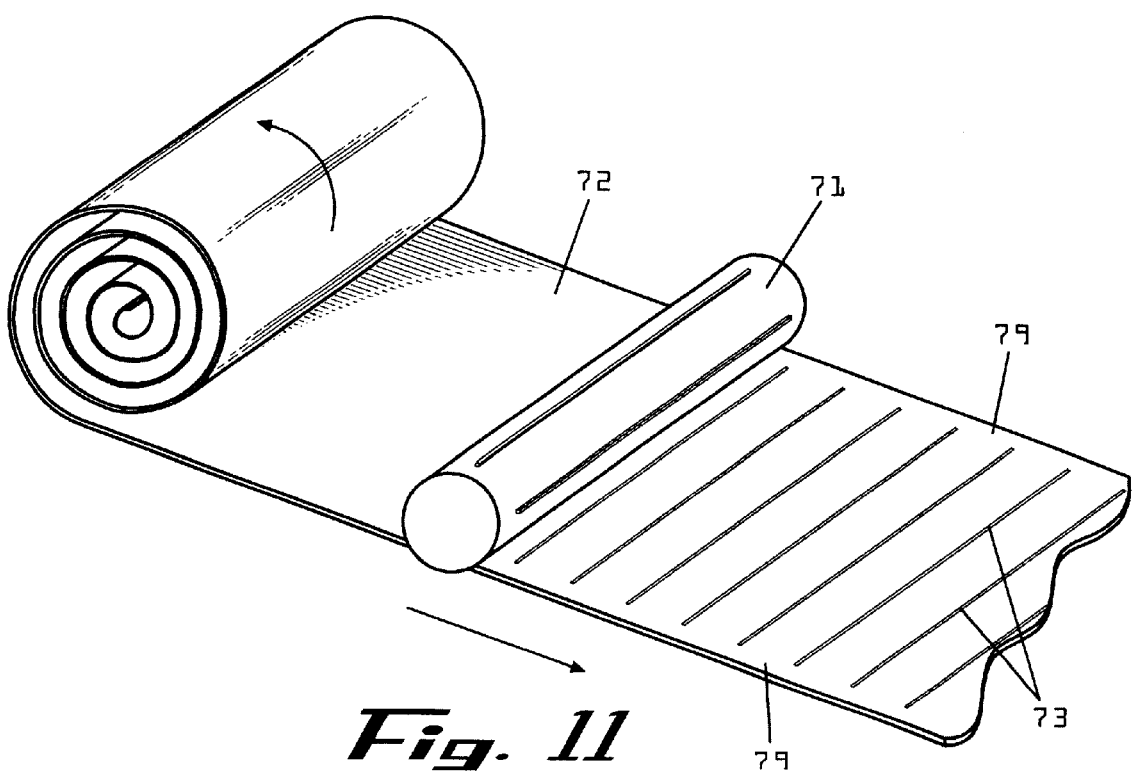
FIG. 11 is a schematic perspective illustration of the process of forming the laterally extending ribs in the heat reflective sheet material.

FIGS. 10 and 11 show another embodiment of the invention. FIG. 10 illustrates the heat insulated wall structure 70 that includes studs 74, exterior wall board 75, interior wall board 76, blanket insulation 77, and reflective sheet insulation 72.

As shown in FIG. 11, the reflective sheet insulation 72 is formed by advancing a length of the sheet material through fluted roll 71, with the flutes or protrusions of the fluted roll forming indentations or lateral ribs or pleats 73. The ribs 73 function as spacers when the heat reflective sheet material 72 is positioned in the wall structure. The spacers 73 can be oriented in either direction, toward the interior wallboard 76 or toward the blanket insulation 77, for the purpose of creating a dead air space 78 adjacent the surface of the heat reflective sheet 72. The side edges 79 of the heat reflective sheet material reach over the inside surfaces of the studs 74 so that fasteners can be extended therethrough. This holds the heat reflective sheet material in place inside the wall structure.

Figure 12:
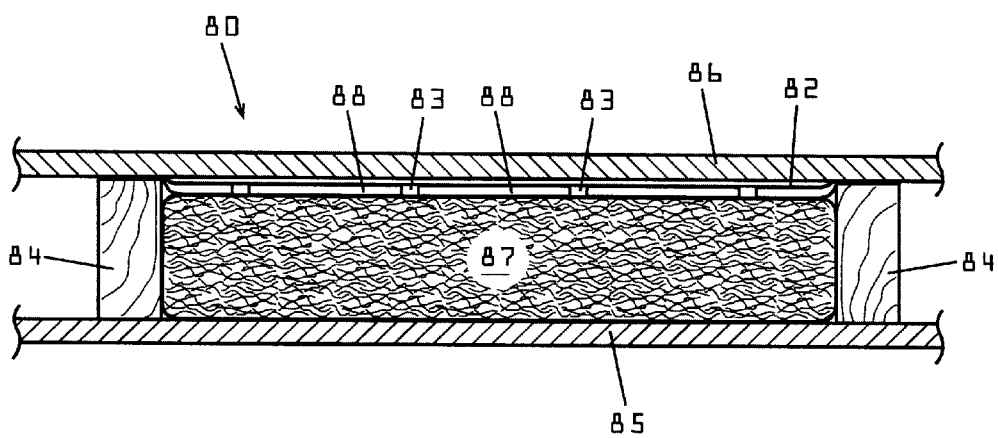
FIG. 12 is another embodiment of a heat insulated wall structure that includes a heat reflective sheet having protrusions formed therein for creating spaces between the heat reflective sheet and the adjacent material.
Figure 13:
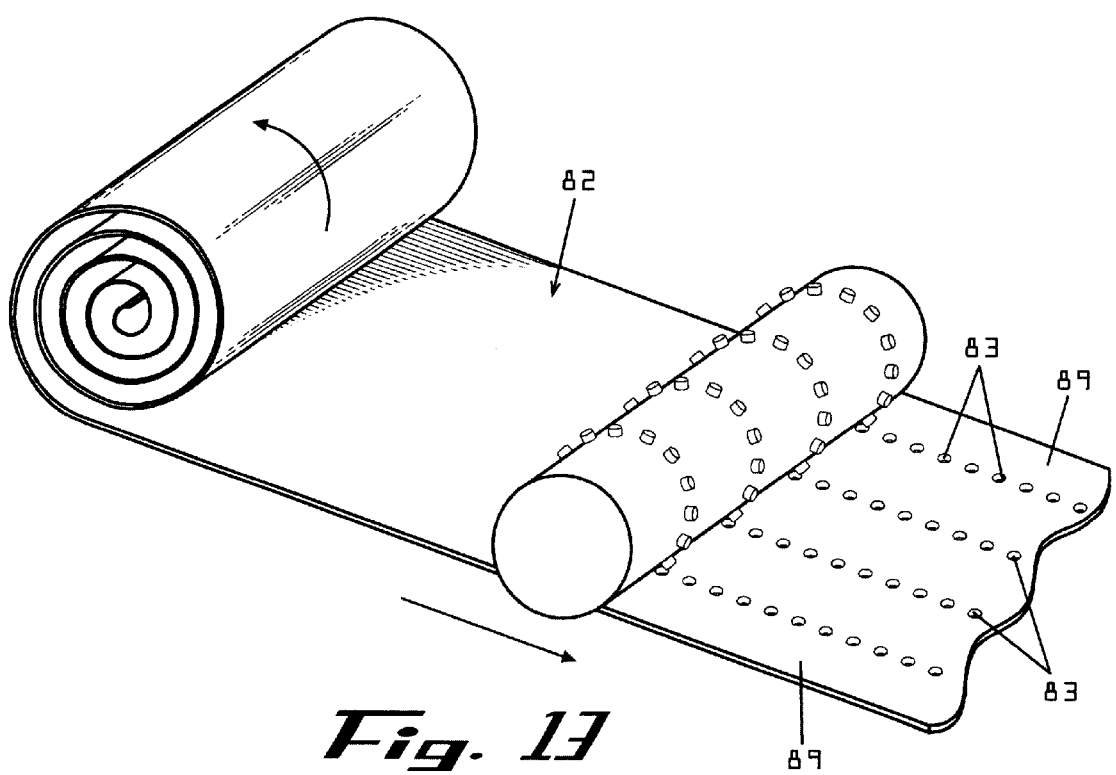
FIG. 13 is a schematic perspective illustration of the process of forming the protrusions in the heat reflective sheet.

As illustrated in FIGS. 12 and 13, another embodiment of the wall structure is disclosed. The heat insulated wall structure 80 includes studs 84, exterior wallboard 85, interior wall board 86, blanket insulation 87, and heat reflective sheet material 82.

As shown in FIG. 13, the heat reflective sheet material 82 is advanced adjacent a roller that has protrusions formed thereon, and the rotation of the roller and its protrusion into engagement with the moving sheet material form protrusions 83 that extend outwardly from the plane of the sheet material. As shown in FIG. 12, when the heat reflective sheet material 82 is positioned in the wall structure, the protrusions function as spacers 83 that extend away from the plane of the sheet material 82, forming dead air spaces 88 between the heat reflective sheet material 82 and the next adjacent material, the blanket insulation 87. If desired, the orientation of the heat reflective sheet material can be reversed so that its spacers 83 face the interior wall board 86, and the dead air spaces will be positioned between the sheet material 82 and the interior wall board 86. As before, the side edges 89 of the heat reflective sheet material 82 reaches over the inside surfaces of the studs 84 so that staples or other fasteners can be used to attach the sheet material 82 to the studs.

While the invention has been disclosed as a heat insulated wall structure, the invention also applies to floors, roofs, ceilings and other types of building structures. The expression "wall structure" is considered to be descriptive of these other types of structures.

In the situation where the heat reflective sheet is mounted horizontally instead of vertically, it is desirable that the spacers face downwardly from the sheet, so that the reflective surface adjacent the spacers would not tend to accumulate dust, fibers, and other debris that might fall by gravity onto the upwardly facing surface of the sheet material. This preserves the bright reflective surface, maximizing the reflectivity of the surface.

While the expression "dead air space" has been utilized to describe the space formed by the spacers, it is also possible that the space can be filled with other gases, such as nitrogen, if desired, and that the space can have movement of air or other gas into or out of the space, and not be perfectly "dead air." Also, it is desirable that the spacers be formed of inert material and have enough strength to maintain the space adjacent the sheet material, particularly when the sheet material is oriented horizontally.

While the dead air space enhances the reflectivity capability of the reflective sheet material, the opposed surface provides a low emissivity. As a result, the orientation of the reflective sheet material is not critical with respect to its heat reflective insulation properties.

While the invention is described as having the heat reflective insulation mounted individually to the wall structure by connecting its side edges 39 to the studs 44, the heat reflective sheets 32, 42, 52, 62, 72 and 82 can be mounted to the insulation blanket by adhesively connecting the side edges 39, 49, 59, etc. to the tabs of the blanket. With this arrangement, the installation procedures at the job site are simplified. The contractor will be assured of having the spacers oriented correctly with respect to the blanket insulation, if desired.

Figure 14:
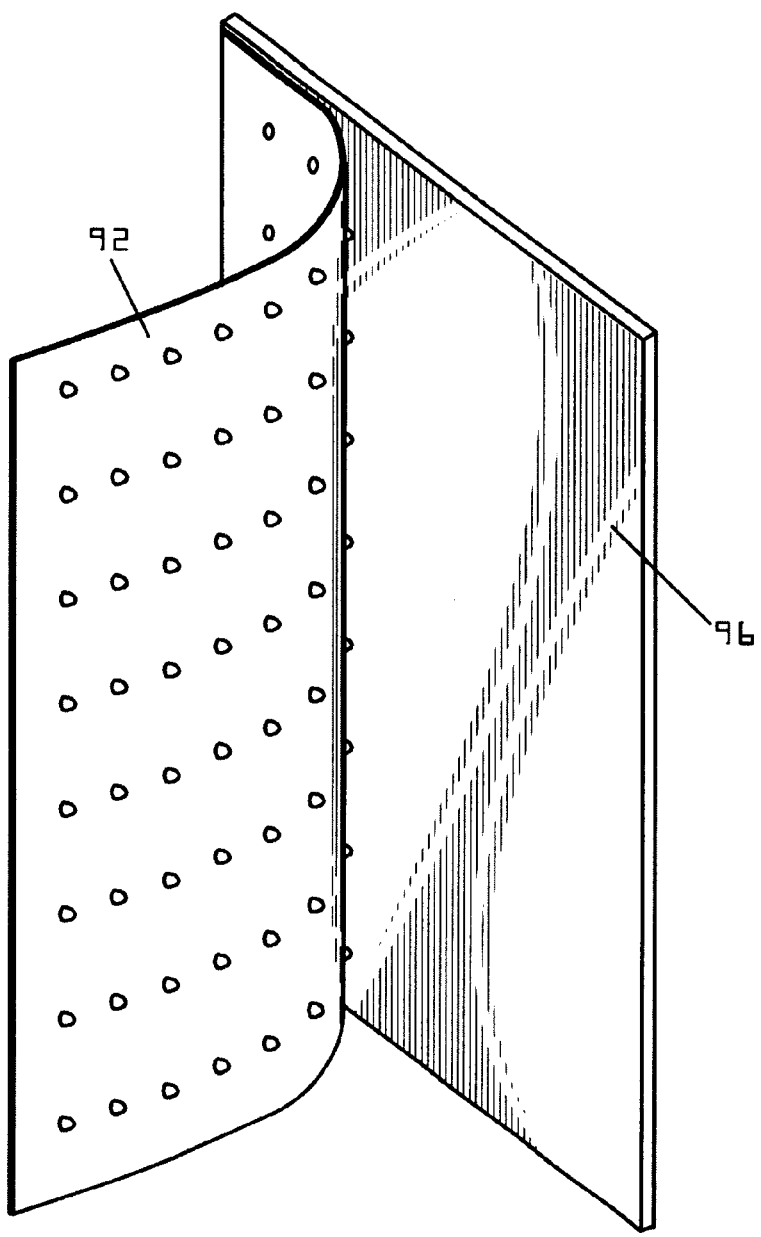
FIG. 14 is a perspective illustration of an interior wallboard having heat reflective sheet applied thereto and partially removed therefrom for illustrative purposes.

In another embodiment illustrated in FIG. 14, the heat reflective sheet 92 can be applied to the interior wall board 96, by forming the sheet in larger widths that correspond to the width of the wall board and adhering the facing surfaces together.

It is desirable that the dead air space formed between the reflective sheet and the adjacent structure be of constant depth and of a depth of at least ¼th inch, which is the depth considered the practical minimum for the dead air space to allow efficient heat reflection. Accordingly, the spacers are formed of substantially consistent width and of a minimum size to hold the reflective sheet and the adjacent structure at least at the minimum separation.

Although preferred embodiments of the invention have been disclosed in detail herein, it will be obvious to those skilled in the art that variations and modifications of the disclosed embodiments can be made without departing from the spirit and scope of the invention as set forth in the following claims.

I claim:

1. A heat insulated wall structure for a building structure positioned between an interior heat controlled space of the building structure and the outside environment adjacent the building structure, comprising:
    a series of spaced parallel support members,
    an exterior wall applied to said spaced parallel support members between said spaced parallel support members and the outside environment,
    blanket heat insulation material positioned between said parallel support members adjacent said exterior wall,
    wall board applied to said spaced parallel support members between said spaced parallel support members and the heat controlled space of the building structure,
    a heat reflective sheet mounted between said blanket insulation and said wall board, and
    spacers supported by said heat reflective sheet for engaging an adjacent surface and maintaining air spaces adjacent said heat reflective sheet so that said heat reflective sheet is not occluded.

2. The heat insulated wall structure of claim 1, wherein said heat reflective sheet is metal foil.

3. The heat insulated wall structure of claim 1, wherein said plurality of spacers comprises a plurality of objects spaced from one another and forming air spaces there between.

4. The heat insulated wall structure of claim 1, wherein said spacers are positioned between said heat reflective sheet and said wallboard.

5. The heat insulated wall structure of claim 1, wherein said spacers are positioned between heat reflective sheet and said blanket heat insulation material.

6. The heat insulated wall structure of claim 1, wherein said spacers are adhesively mounted in place.

7. The heat insulated wall structure of claim 1, wherein said spacers are heat fused in place.

8. The heat insulated wall structure of claim 1, wherein said spacers comprise sheet material with an irregularly shaped surface.

9. The heat insulated wall structure of claim 1, wherein said heat reflective sheet and said blanket insulation are connected together in overlying relationship with said spacers positioned there between.

10. The heat insulated wall structure of claim 1, wherein said heat reflective sheet and said wallboard are connected together in overlying relationship with said spacers positioned there between.

11. The heat insulated wall structure of claim 1, wherein said heat reflective material has a central body portion and edges straddling said central body portion, and said edges are attached to said spaced parallel support members.

12. The heat insulated wall structure of claim 1, wherein said spacers comprise elongated strips of material extending parallel to one another.

13. A heat insulation blanket assembly for application to a building structure, said heat insulation blanket assembly comprising:
    an elongated blanket of heat insulation material having a first surface for facing a temperature controlled interior space of a building structure and a second surface for facing the atmosphere outside the building structure, and opposed side edge surfaces,
    a layer of radiant heat reflective sheet insulation applied in overlying relationship to said first surface of said elongated blanket of heat insulation material for facing the interior of said building structure,
    a plurality of protrusions formed in said layer of radiant heat reflective sheet insulation and spaced from one another for maintaining said layer of radiant heat reflective sheet insulation spaced from an adjacent surface and for forming a space adjacent said layer of radiant heat reflective sheet insulation.

14. The heat insulation blanket assembly of claim 13, wherein said plurality of protrusions face away from said blanket of heat insulation material for facing the temperature controlled interior of a building structure.

15. The heat insulation blanket assembly of claim 13, wherein said layer of radiant heat reflective sheet insulation is metal foil.

16. The heat insulation blanket assembly of claim 13, wherein said blanket of heat insulation material is formed of fiberglass.

17. The heat insulation blanket assembly of claim 13, wherein said plurality of protrusions comprises a plurality of deformations formed in said radiant heat reflective sheet insulation.

18. The heat insulation blanket assembly of claim 13, wherein said plurality of protrusions comprise corrugations formed in said layer of radiant heat reflective sheet insulation.

19. The heat insulation blanket assembly of claim 13, wherein said elongated blanket of heat insulation material is of a width that is sized for spanning a space between studs of a vertical wall on sixteen inch centers.

20. The heat insulation blanket assembly of claim 13, wherein said blanket of heat insulation material includes tabs formed on said opposed side edge surfaces for mounting to support elements of a building structure.

21. The heat insulation blanket assembly of claim 20, wherein said layer of radiant heat reflective sheet insulation is applied to said tabs of said blanket of heat insulation material.

22. The heat insulation blanket assembly of claim 13, wherein said protrusions formed in said layer of radiant heat reflective sheet insulation extend toward said blanket of heat insulation material and form air spaces between said layer of radiant heat reflective sheet insulation and said blanket of heat insulation material.

23. The heat insulation blanket assembly of claim 13, wherein said protrusions formed in said layer of radiant heat reflective sheet insulation extend away from said blanket of heat insulation material for forming air spaces between said layer of radiant heat reflective sheet insulation and an adjacent structure.

24. Heat insulated wallboard for application in a wall structure of a building structure, comprising:

a board formed of heat insulation material, a sheet of heat reflective material, protrusions formed in said sheet of heat reflective material, and said protrusions engaging said board and holding said sheet of heat reflective material away from said board.

25. The heat insulated wall board of claim 24, wherein said board comprises gypsum board.

26. The heat insulated wallboard of claim 24, wherein said protrusions are adhesively mounted to said board.

27. The heat insulated wallboard of claim 24, wherein said sheet of heat reflective material comprises metal foil.

28. Heat insulated wallboard for application in a wall structure of a building structure, comprising:

a board, a sheet of heat reflective material, spacers disposed between said board and said sheet of heat reflective material, said spacers holding said sheet of heat reflective material away from said board, said spacers comprising protrusions formed in said sheet of heat reflective material and extending toward said board, and said protrusions are adhered to said board.

29. The heat insulated wallboard of claim 24, wherein said protrusions comprise corrugations formed in said sheet of heat reflective material.

30. A heat insulated wall structure comprising a plurality of overlying layers of sheet material, the improvement therein of a sheet of radiant heat insulation positioned between said overlying layers of sheet material and including a plurality of spacers supported thereby and protruding therefrom for engagement with a next adjacent one of said layers of sheet material for forming a space between said sheet of radiant heat insulation and the next adjacent layer of sheet material.

31. The heat insulated wall structure of claim 30, wherein said plurality of spacers is selected from a group consisting of an array of protrusions formed in said sheet of radiant heat insulation, accordion folds formed in said sheet of radiant heat insulation, elongated parallel strips of material, parallel folds formed in said sheet of radiant heat insulation, and an array of objects supported adjacent said sheet of radiant heat insulation.

32. The heat insulated wall structure of claim 30, wherein said sheet of radiant heat insulation is metal foil.

33. The heat insulated wall structure of claim 30, wherein said plurality of spacers comprises a plurality of objects spaced from one another and forming air spaces therebetween.

34. The heat insulated wall structure of claim 30, wherein said spacers are adhesively mounted in place.

35. The heat insulated wall structure of claims 30, wherein said spacers are heat fused in place.

36. The heat insulated wall structure of claim 30, wherein said spacers comprise sheet material with an irregularly shaped surface.

37. The heat insulated wall structure of claim 30, wherein said sheet of radiant heat insulation has a central body portion and edges straddling said central body portion, said plurality of spacers supported by said central body portion, and said edges are attached to said plurality of overlying layers of sheet material.

38. In an insulated wall structure having a layer of heat insulation material, the improvement therein of a sheet of metal foil supporting on one side thereof an array of spacers for facing said layer of heat insulation material and forming a space between said sheet and said layer of heat insulation material.

39. The radiant heat insulation of claim 38, wherein said spacers are selected from the group consisting of: an array of protrusions formed in said sheet, folds formed in said sheet, elongated parallel strips of material supported adjacent said sheet, and an array of objects supported adjacent said sheet.

40. A heat insulation assembly including heat insulation material and radiant heat reflective material shaped with protrusions extending therefrom and disposed in overlapping relation with said insulation material.

* * * * *